(12) United States Patent
Sugaya

(10) Patent No.: US 10,397,468 B2
(45) Date of Patent: Aug. 27, 2019

(54) RECORDED IMAGE SHARING SYSTEM, METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 16/057,986

(22) Filed: Aug. 8, 2018

(65) Prior Publication Data
US 2018/0352149 A1    Dec. 6, 2018

Related U.S. Application Data

(63) Continuation-in-part of application No. PCT/JP2016/066038, filed on May 31, 2016.

(51) Int. Cl.
| | |
|---|---|
| H04N 5/775 | (2006.01) |
| H04N 5/232 | (2006.01) |
| G10L 15/22 | (2006.01) |
| G11B 27/11 | (2006.01) |
| H04N 5/77 | (2006.01) |
| H04N 7/18 | (2006.01) |
| H04N 9/80 | (2006.01) |

(Continued)

(52) U.S. Cl.
CPC ......... *H04N 5/23219* (2013.01); *G10L 15/22* (2013.01); *G11B 27/11* (2013.01); *H04N 5/232* (2013.01); *H04N 5/23293* (2013.01); *H04N 5/77* (2013.01); *H04N 7/188* (2013.01); *G10L 15/00* (2013.01); *G10L 25/51* (2013.01); *G10L 2015/223* (2013.01)

(58) Field of Classification Search
USPC .......................... 386/230, 248, 278
See application file for complete search history.

(56) References Cited

U.S. PATENT DOCUMENTS

| | | | |
|---|---|---|---|
| 2006/0098088 A1* | 5/2006 | Raghunath | H04N 5/782 348/61 |
| 2008/0030580 A1* | 2/2008 | Kashiwa | G08B 13/19621 348/158 |

(Continued)

FOREIGN PATENT DOCUMENTS

| | | |
|---|---|---|
| JP | 2003-153165 | 5/2003 |
| JP | 2006-148842 | 6/2006 |

(Continued)

*Primary Examiner* — Nigar Chowdhury
(74) *Attorney, Agent, or Firm* — Lex IP Meister, PLLC

(57) ABSTRACT

A recorded image sharing system that detects a predetermined trigger and displays, on a display unit of an operator terminal, a recorded image of a predetermined time including the detected predetermined trigger among recorded images is provided. The recorded image sharing system 1 shares a recorded image of a captured image captured by a wearable terminal 10 with a connected operator terminal 20. The recorded image sharing system 1 includes a recording module 201 that records captured images captured by the wearable terminal 10, a detecting unit 204 that detects a predetermined trigger, and a display control unit 206 that displays, on a display unit 24 of the operator terminal 20, a recorded image of a predetermined time including the detected predetermined trigger among the recorded images.

8 Claims, 7 Drawing Sheets

(51) Int. Cl.
 *G10L 25/51* (2013.01)
 *G10L 15/00* (2013.01)

(56) References Cited

U.S. PATENT DOCUMENTS

| | | | | |
|---|---|---|---|---|
| 2008/0144906 A1* | 6/2008 | Allred | .................. | A61B 5/0059 |
| | | | | 382/131 |
| 2012/0176517 A1* | 7/2012 | Lee | .................... | H04N 5/23219 |
| | | | | 348/240.99 |
| 2014/0079280 A1* | 3/2014 | Price | ........................ | G06K 9/62 |
| | | | | 382/103 |
| 2014/0347479 A1* | 11/2014 | Givon | ................ | G06K 9/00342 |
| | | | | 348/143 |
| 2015/0033150 A1* | 1/2015 | Lee | .................... | H04N 5/23206 |
| | | | | 715/753 |
| 2015/0356840 A1* | 12/2015 | Wang | ............... | G08B 13/19682 |
| | | | | 382/103 |
| 2016/0026890 A1* | 1/2016 | Gupta | ........................ | G06K 9/46 |
| | | | | 382/103 |
| 2016/0034784 A1* | 2/2016 | Ohmura | ........... | G08B 13/19613 |
| | | | | 382/103 |
| 2016/0119667 A1* | 4/2016 | Layson, Jr. | ........ | H04N 21/6131 |
| | | | | 386/226 |
| 2019/0035240 A1* | 1/2019 | Trundle | ................ | G08B 13/196 |

FOREIGN PATENT DOCUMENTS

JP  2007-221328  8/2007
JP  2015-233188  12/2015

\* cited by examiner

FIG. 6

| Trigger ID | Predetermined Trigger | | Predetermined Time |
|---|---|---|---|
| | Trigger | Reference Data | |
| 01 | Pointing Action | Trigger Reference Image Data 01 | 15 seconds |
| . | . | . | . |
| . | . | . | . |
| . | . | . | . |
| 10 | User's voice | Trigger Reference voice Data | 30 seconds |
| . | . | . | . |
| . | . | . | . |
| . | . | . | . |
| 20 | Environmental Sound | Trigger Reference voice Data 10 | 60 seconds |
| . | . | . | . |
| . | . | . | . |
| . | . | . | . |

RECORDED IMAGE SHARING SYSTEM, METHOD, AND PROGRAM

CROSS-REFERENCE TO RELATED APPLICATION

This application is a continuation-in-part of PCT Application No. PCT/JP2016/066038 filed on May 31, 2016, the entire contents of which are incorporated herein by reference.

BACKGROUND (a) Field

The present invention relates to a recorded image sharing system that shares a recorded image of a captured image captured by a wearable terminal with a connected operator terminal.

(b) Description of the Related Art

Conventionally, a wearable terminal capable of continuous imaging and recording in a hands-free manner is known.

As the wearable terminal, a wearable monitoring camera system has been proposed (see Japanese Patent Application Publication No. 2006-148842 (hereinafter referred to as "'842 publication"). The wearable monitoring camera system includes a CCD camera unit which is worn on a body and has an imaging lens directed toward the front of the body and a laser beam generating unit of a button operation arranged in the vicinity of the imaging lens, an encoding server unit which is housed in a pouch unit to be worn on the body, encodes an image signal from the CCD camera unit and a date and time information signal from a built-in clock unit, and is capable of recording the date and time information converted into character information by superimposing it on an image captured by an image capturing device, and a battery unit for supplying power. According to the wearable monitoring camera system of '842 publication, in order to capture the image ahead of the body by the CCD camera unit worn on the body, a wearer of the CCD camera unit can continuously capture omnidirectional images which can be directed to the body part in a hands-free manner, and record the omnidirectional images which are encoded by the encoding server unit and are imprinted with date and time information.

However, although the wearable monitoring camera system of '842 publication records the images continuously, when wishing to see a desired recorded portion from the consecutively recorded images, the wearable monitoring camera system should reproduce the images sequentially and find the desired recording portion by visual observation. As such, there is a technical problem in the existing technology related to the recorded image sharing that the convenience of the recorded image sharing system is low because the recorded image sharing system cannot provide a technical solution for allowing the user to easily or quickly find the desired recorded portion among the recorded images.

SUMMARY

An aspect of the present invention provides a recorded image sharing system, a method, and a program which detect a predetermined trigger and display a recorded image of a predetermined time including the detected predetermined trigger among recorded images on a display unit of an operator terminal.

A first aspect of the present invention provides a recorded image sharing system that shares a recorded image of a captured image captured by a wearable terminal with a connected operator terminal, includes a recording unit that records captured images captured by the wearable terminal, the recorded image sharing system including a detecting unit that detects a predetermined trigger, and a display control unit that displays, on a display unit of the operator terminal, a recorded image of a predetermined time including the detected predetermined trigger among the recorded images.

According to the first aspect of the present invention, a recorded image sharing system that shares a recorded image of a captured image captured by a wearable terminal with a connected operator terminal includes a recording unit, a detecting unit and a display control unit. The recording unit records captured images captured by the wearable terminal. The detecting unit detects a predetermined trigger. The display control unit displays, on a display unit of the operator terminal, a recorded image of a predetermined time including the detected predetermined trigger among the recorded images.

The invention according to the first aspect is a category of a system, but exhibits the same action and effect even in a method and a program.

Therefore, it is possible to provide a recorded image sharing system, a method, and a program for detecting a predetermined trigger and displaying, on a display unit of the operator terminal, a recorded image of a predetermined time including the detected predetermined trigger among recorded images.

A second aspect of the present invention provides the recorded image sharing system, wherein the detecting units detects an action of a user of the wearable terminal as the predetermined trigger, in addition to the invention according to the first aspect.

According to the second aspect of the invention, the recorded image sharing system that detects an action of a user of the wearable terminal and displays, on a display unit of the operator terminal, a recorded image of a predetermined time including a time when the action has been detected among recorded images can be provided. Accordingly, for example, in a case where a user wearing the wearable terminal performs, for example, safety confirmation or identification of a recording target by the pointing action, the recorded image sharing system can set the predetermined trigger as the pointing action, thereby displaying, on the display unit of the operator terminal, a recording image of a predetermined time including a time when the safety confirmation has been performed or the recording target has been recorded by the pointing action.

A third aspect of the present invention provides the recorded image sharing system further including another recording unit that records a sound collected by the wearable terminal, wherein the detecting unit detects a voice of the user of the wearable terminal as the predetermined trigger, in addition to the invention according to the first aspect.

According to the third aspect of the invention, the recorded image sharing system that detects a voice of the user of the wearable terminal and displays, on a display unit of the operator terminal, a recorded image of a predetermined time including a time when the voice of the user has been uttered among recorded images can be provided. Accordingly, for example, in a case where a user wearing the wearable terminal utters, for example, a signal of a start or a name of a recording target, the recorded image sharing system can set the predetermined trigger as a voice of uttering the signal of the start or the name of the recording target, thereby displaying, on the display unit of the operator terminal, a recording image of a predetermined time including a time when the voice has been uttered.

A fourth aspect of the present invention provides the recorded image sharing system further including another recording unit that records a sound collected by the wearable terminal, wherein the detecting unit detects a combination of an action and a voice of a user of the wearable terminal as the predetermined trigger, in addition to the invention according to the first aspect.

According to the fourth aspect of the invention, the recorded image sharing system that detects a combination of an action and a voice of a user of the wearable terminal and displays, on a display unit of the operator terminal, a recorded image of a predetermined time including a time when the action of the user has been performed and the voice of the user has been uttered among recorded images can be provided. Accordingly, for example, in a case where a user wearing the wearable terminal utters, for example, a name of a recording target together with a pointing action, the recorded image sharing system can set the predetermined trigger as the pointing action and the voice of uttering the name of the recording target, thereby displaying, on the display unit of the operator terminal, a recording image of a predetermined time including a time when the voice has been uttered together with the pointing action.

A fifth aspect of the present invention provides the recorded image sharing system, wherein the detecting unit detects a predetermined environmental sound as the predetermined trigger, in addition to the invention according to the first aspect.

According to the fifth aspect of the invention, the recorded image sharing system that detects a predetermined environmental sound and displays, on a display unit of the operator terminal, a recorded image of a predetermined time including a time when the predetermined environmental sound has occurred among recorded images can be provided. Accordingly, for example, in a case where a user wearing the wearable terminal encounters, for example, an accident, the recorded image sharing system can set the predetermined trigger as an impulsive sound or a sudden braking sound, thereby displaying, on the display unit of the operator terminal, a recording image of a predetermined time including a time when the accident has occurred.

A sixth aspect of the present invention provides the recorded image sharing system further including a time changing unit that changes the predetermined time in accordance with a target detected by the detecting unit or the recorded image, in addition to the invention according to the first aspect According to the sixth aspect of the invention, the recorded image sharing system that can change a time of a recorded image to be displayed on a display unit of the operator terminal in accordance with the predetermined trigger or the recorded image can be provided. Accordingly, the recorded image sharing system can set the predetermined trigger to be different in accordance with a time required to record the recording target, thereby extracting the recorded image without excess or deficiency and displaying the recorded image on the display unit of the operator terminal.

A seventh aspect of the present invention provides the recorded image sharing system, wherein the recorded image of the predetermined time including the detected predetermined trigger is displayed on a display unit of the wearable terminal, in addition to the invention according to the first aspect According to the seventh aspect of the invention, the recorded image sharing system that can detect a predetermined trigger and display, on a display unit of the operator terminal and a display unit of the wearable terminal, a recorded image of a predetermined time including the detected predetermined trigger among recorded images can be provided. Accordingly, for example, even when the user wearing the wearable terminal cannot visually recognize the operator terminal, the user can confirm the recorded image.

An eighth aspect of the present invention provides a recorded image sharing system that shares a recorded image of a captured image captured by a wearable terminal with a connected operator terminal, the recorded image sharing system including a storage unit that stores trigger data in advance, trigger IDs indicating predetermined triggers being associated with reference data for detecting the predetermined triggers and predetermined times each being a time for displaying a recorded image including a predetermined trigger when the predetermined trigger is detected, in the trigger data, a recording unit that records captured images captured by the wearable terminal, a detecting unit that detects a predetermined trigger by referring to the reference data, a time changing unit that changes a predetermined time which is a time for displaying a recorded image including the detected predetermined trigger by referring to the trigger data, and a display control unit that displays, on a display unit of the operator terminal, the recorded image including the detected predetermined trigger among the recorded images.

According to the eighth aspect of the present invention, because the recorded image including the detected predetermined trigger among the recorded images can be displayed for the time changed according to the trigger data associated with the detected predetermined trigger (i.e., the time being appropriate to find the detected predetermined trigger), the operator can easily and quickly find the recorded image including the detected predetermined trigger among the recorded images. Accordingly, the eighth aspect of the present invention can provide a technical solution for allowing the operator to easily and quickly find the desired recorded portion among the recorded images, thereby improving the convenience of the recorded image sharing system.

According to an aspect of the present invention, a recorded image sharing system, method, and program which detects a predetermined trigger and displays a recorded image of a predetermined time including the detected predetermined trigger among recorded images on a display unit of an operator terminal can be provided.

BRIEF DESCRIPTION OF THE DRAWINGS

FIG. 6 is a diagram for explaining trigger data 210 stored in a storage unit 22 of an operator terminal 20.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Recorded Image Sharing System 1

Figure 1:
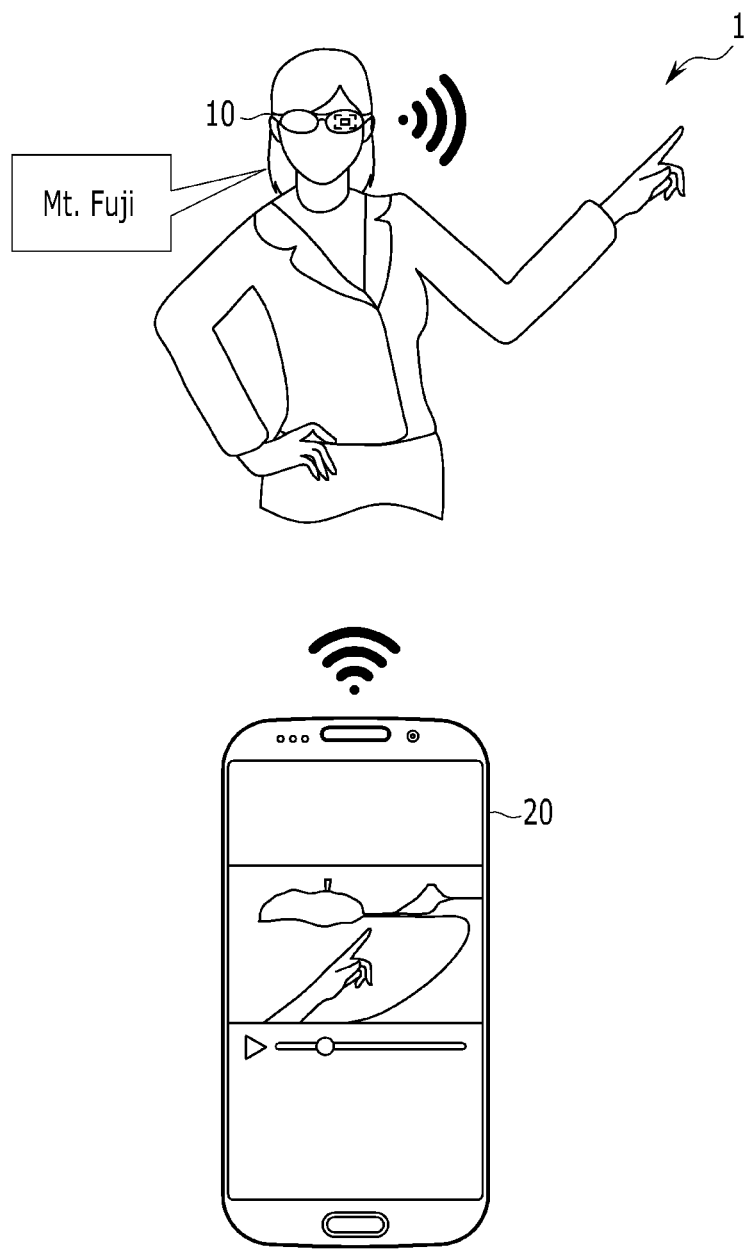
FIG. 1 is a diagram for explaining an overview of a recorded image sharing system 1 which is an embodiment of the present invention.

FIG. 1 is a diagram for explaining an overview of a recorded image sharing system 1 according to an embodiment of the present invention. An overview of the recorded image sharing system 1 is described with reference to FIG. 1. The recorded image sharing system 1 includes a wearable terminal 10 and an operator terminal 20.

The recorded image sharing system 1 shares recorded images of captured images captured by the wearable terminal 10 attached to a user with the connected operator terminal 20.

The recorded image sharing system 1 transmits the captured images captured by the wearable terminal 10 and collected sounds to an operator terminal 20 connected, for example, via a wireless LAN (Local Area Network), and the operator terminal 20 records the transmitted captured images and sounds. The operator terminal 20, upon detecting a predetermined trigger, displays a recorded image of a predetermined time including the detected predetermined trigger from among the recorded images.

In the present embodiment, the "predetermined trigger" includes a predetermined action (for example, a pointing action or the like) performed by the user of the wearable terminal 10, or a voice (for example, a signal of a start, a voice uttering a name of a recording target, or the like) of the user, a combination thereof, or a predetermined environmental sound (for example, an impulsive sound, a sudden braking sound, or the like).

In an example shown in FIG. 1, when the user captures Mount Fuji in the wearable terminal 10, the user performs a pointing action and utters "Mount Fuji". Then, in the recorded image sharing system 1, the wearable terminal 10 captures the pointing action, collects the utterance, and transmits the captured image and collected sound data to the operator terminal 20.

When detecting that the received data include the captured image of the pointing action or the voice in which a name ("Mount Fuji" in the example shown in FIG. 1) of a recording target is uttered as the predetermined trigger, the operator terminal 20 performs recording by adding an index associated with the predetermined trigger to a position on a time axis of the captured images.

Next, the operator terminal 20 reproduces the recorded data based on an operation of the user. In this case, the operator terminal 20 detects the predetermined trigger when receiving, from the wearable terminal 10, the data of the captured image of the pointing action or data of the voice in which the name ("Mount Fuji" in the example shown in FIG. 1) of the recording target is uttered, which is the predetermined trigger.

Then, the operator terminal 20 searches for the index associated with the detected predetermined trigger from among the recorded images, and displays a recorded image of a predetermined time including the position on the time axis to which the index is added.

As a result, it is possible to promptly reproduce a desired recording location from among recorded images which are continuously recorded.

System Configuration of Recorded Image Sharing System

Figure 2:
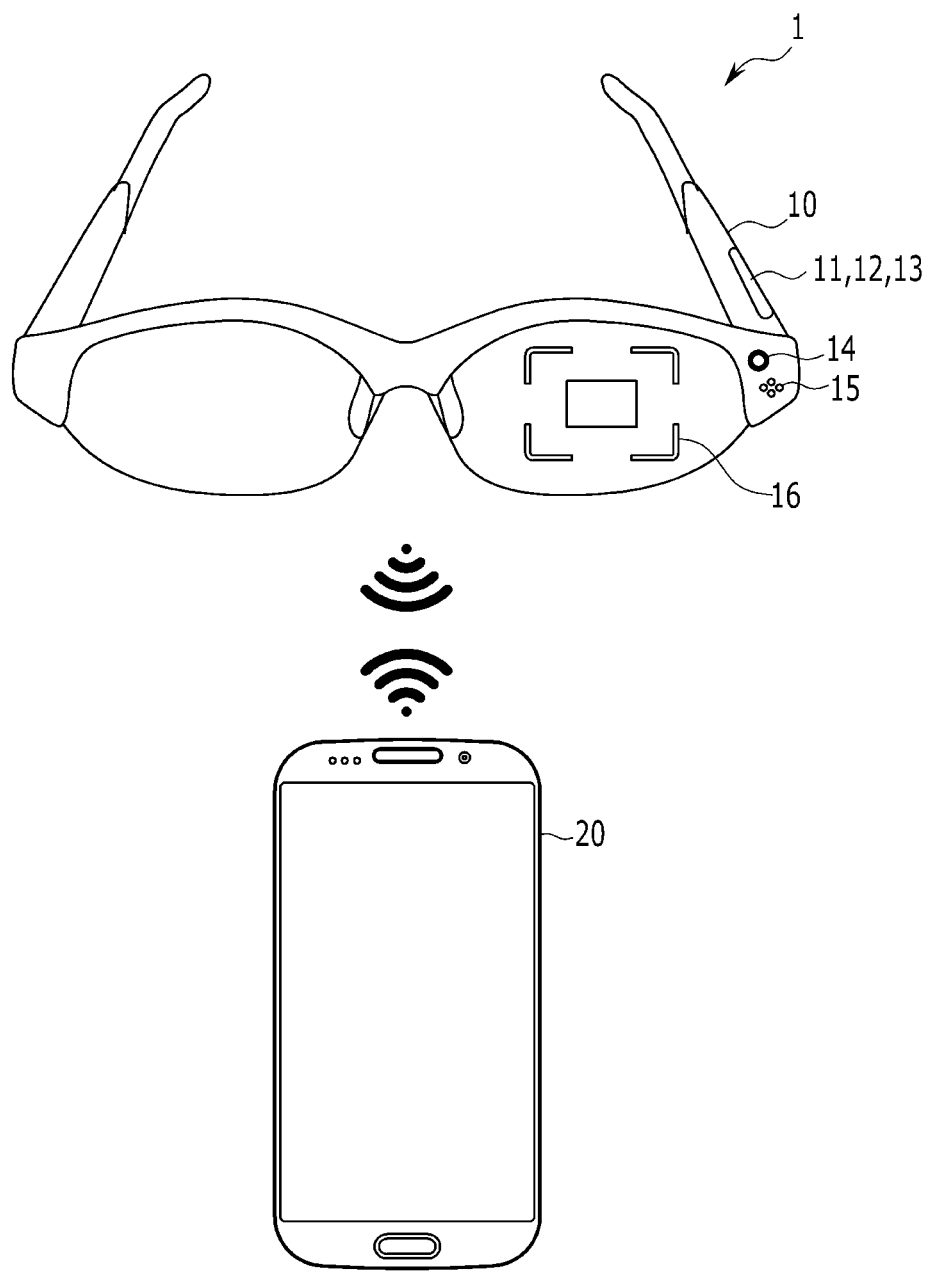
FIG. 2 is an overall configuration diagram of a recorded image sharing system 1.

FIG. 2 is an overall configuration diagram of a recorded image sharing system 1 according to an embodiment of the present invention. The recorded image sharing system 1 includes a wearable terminal 10 and an operator terminal 20 connected to the wearable terminal 10 via, for example, a wireless LAN. In the recorded image sharing system 1, the wearable terminal 10 and the operator terminal 20 may be connected by a wired connection instead of the wireless connection but also.

In the present embodiment, the wearable terminal 10 is, for example, a glasses type and includes a control unit 11, a storage unit 12, a communication unit 13, a capturing unit (for example, a CCD camera) 14, a sound collecting unit (for example, a microphone), and a display unit (for example, a transmissive liquid crystal display device) 16 is provided on a lens of an eyeglasses. The wearable terminal 10 may be configured by, for example, a small video camera or the like if it can be worn by a user operating the operator terminal 20, capture an image, collect sound, and transmit the captured image data and collected sound data to the operator terminal 20.

Further, in the present embodiment, the operator terminal 20 may be a general information terminal, or may be an information device having functions to be described later, for example, a portable terminal such as a smartphone, a notebook computer, a netbook terminal, a slate terminal, an electronic book terminal, an electronic dictionary terminal, a portable music player, a portable content playback/recording player, or the like.

Description of Functions

Figure 3:
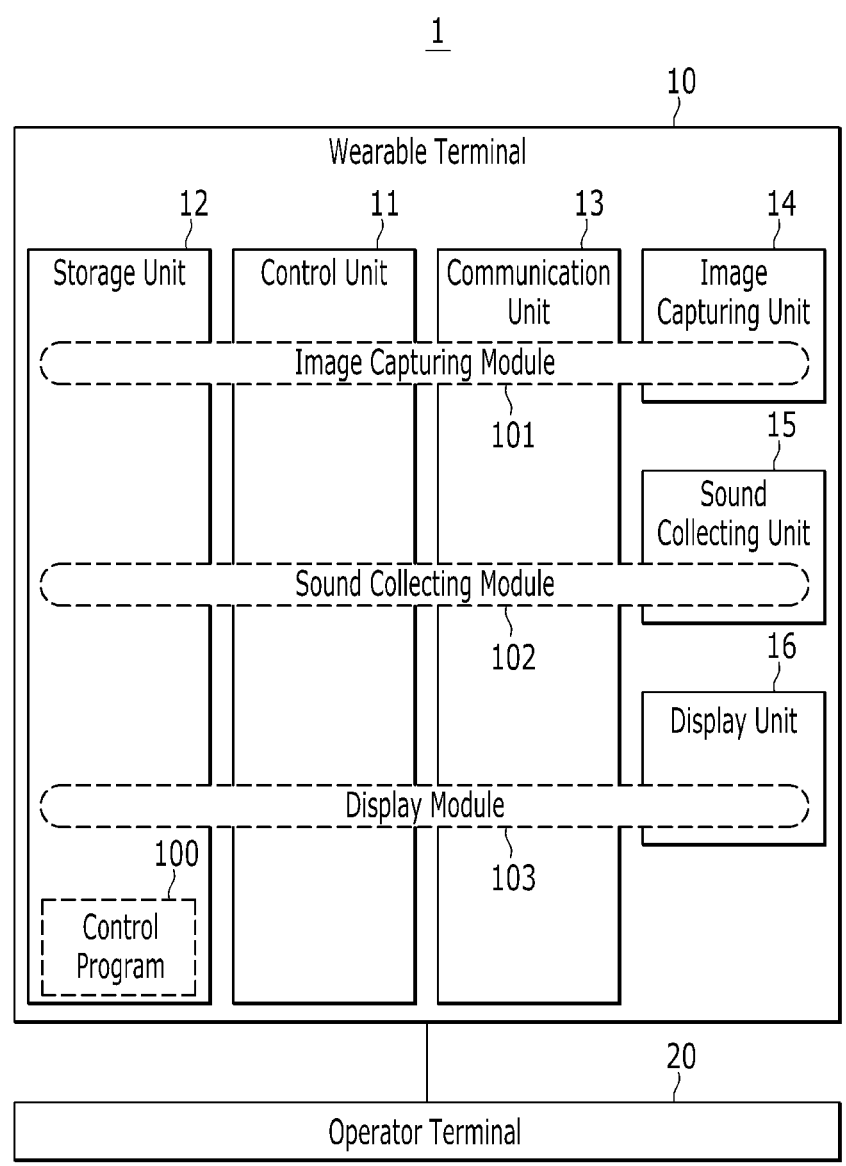
FIG. 3 is a diagram showing function blocks of a wearable terminal 10 and a relationship between the respective functions in a recorded image sharing system 1.
Figure 4:
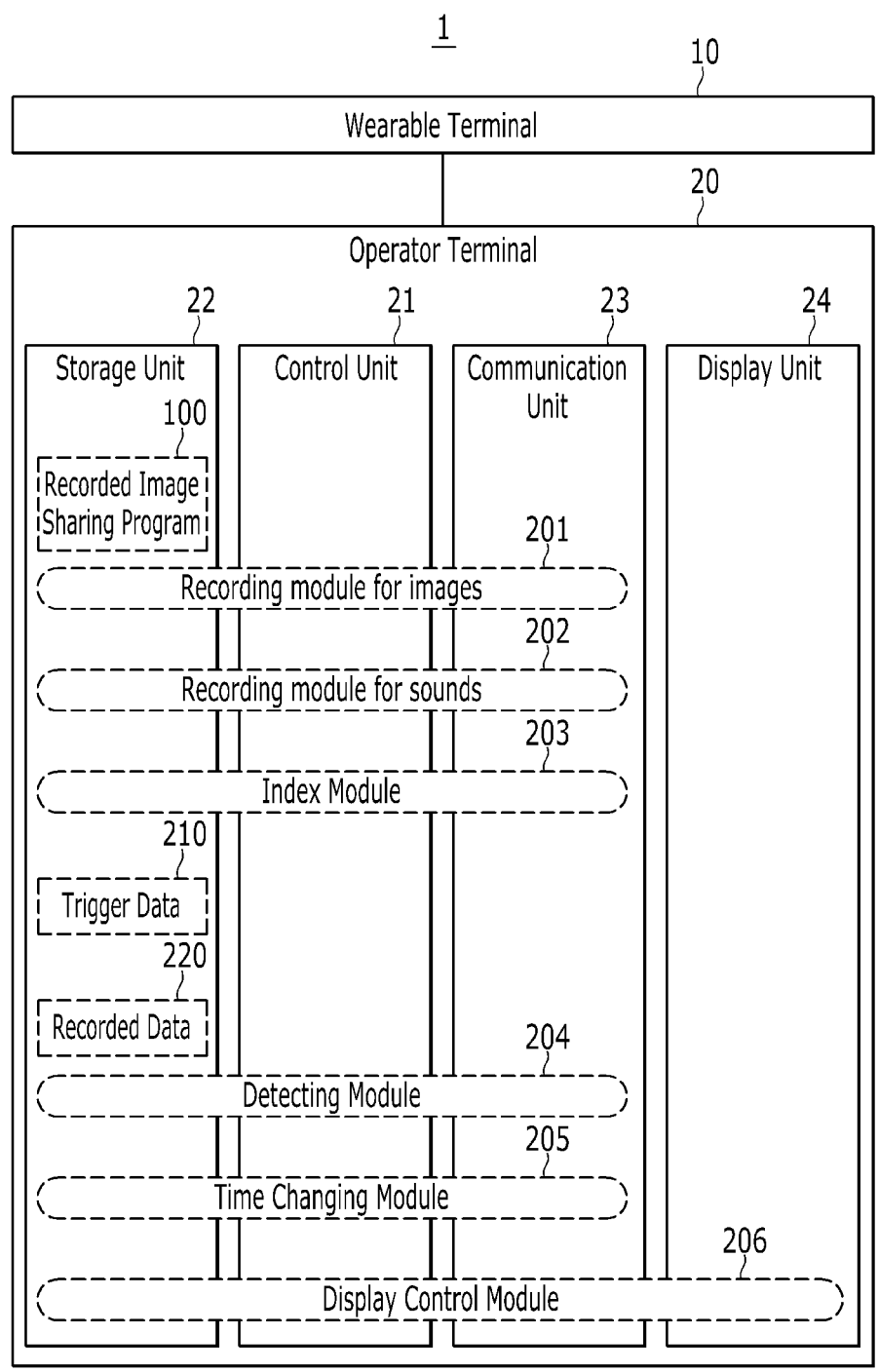
FIG. 4 is a diagram showing function blocks of an operator terminal 20 and a relationship between the respective functions in a recorded image sharing system 1.

FIG. 3 is a diagram showing function blocks of a wearable terminal 10 and a relationship between the respective functions in a recorded image sharing system 1 according to an embodiment of the present invention. FIG. 4 is a diagram showing function blocks of an operator terminal 20 and a relationship between the respective functions in a recorded image sharing system 1 according to an embodiment of the present invention.

As shown in FIG. 3, the wearable terminal 10 includes, as a control unit 110, a processor such as a CPU (Central Processing Unit), a RAM (Random Access Memory), a ROM (Read Only Memory), and the like, and includes, as a storage unit 12, a data storage device such as a hard disk or a semiconductor memory. The wearable terminal 10 includes, as a communication unit 13, a communication device for enabling communication with another device, for example, a WiFi (Wireless Fidelity) compliant device conforming to IEEE 802.11. The storage unit 12 stores a control program 100 and other data required for controlling the wearable terminal 10. In addition, the wearable terminal 10 includes a CCD camera or the like as an image capturing unit 14, a microphone or the like as a sound collecting unit 15, and a transmissive liquid crystal display device as a display unit 16.

In the wearable terminal 10, the control unit 11 reads the control program 100, thereby realizing an image capturing module 101 in cooperation with the storage unit 12, the communication unit 13, and the image capturing unit 14. In addition, in the wearable terminal 10, the control unit 11 reads the control program 100, thereby realizing a sound collecting module 102 in cooperation with the storage unit 12, the communication unit 13, and the sound collecting unit 15. Further, in the wearable terminal 10, the control unit 11 reads the control program 100, thereby realizing a display module 103 in cooperation with the storage unit 12, the communication unit 13, and the display unit 16.

As shown in FIG. 4, like the wearable terminal 10, the operator terminal 20 includes a processor such as a CPU, a RAM, a ROM, and the like as a control unit 21, and a data storage device as a storage unit 22. The operator terminal 20 includes, for example, a communication device such as a WiFi compliant device conforming to IEEE802.11 or a wireless device conforming to International Telecommunication Union standards such as a third generation or fourth generation mobile communication system, as a communication unit 23. The storage unit 22 includes a recorded image sharing program 200, trigger data 210, recorded data 220, and other data necessary for controlling the operator terminal 200. In addition, the operator terminal 20 includes a liquid crystal display device or the like as a display unit 24.

The trigger data 210 include trigger reference image data for detecting a predetermined action by a user, trigger reference voice data for detecting a voice of the user, and trigger reference environmental sound data for detecting a predetermined environmental sound, or the like, which serves as a predetermined trigger. Further, the recorded data 220 are data obtained by recording captured images or collected sound data transmitted from the wearable terminal 10.

In the operator terminal 20, the control unit 21 reads the recorded image sharing program 200, thereby realizing a recording module 201 for images, a recording module 202 for sounds, an index module 203, a detecting module 204 and a time changing module 205 in cooperation with the storage unit 22 and the communication unit 23. In addition, in the operator terminal 20, the control unit 21 reads the recorded image sharing program 200, thereby realizing a display control module 206 in cooperation with the storage unit 22, the communication unit 23, and the display unit 24.

Recorded Image Sharing Process

Figure 5:
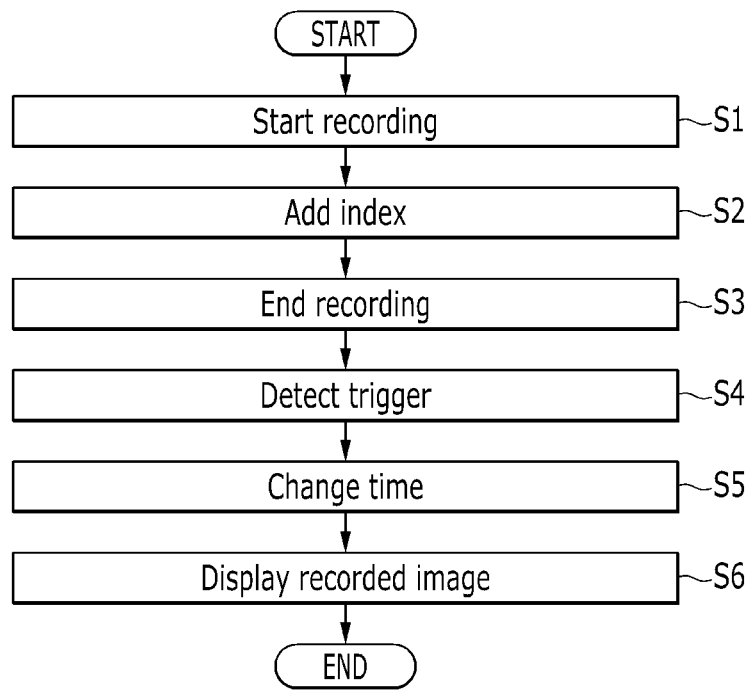
FIG. 5 is a flowchart of a recorded image sharing process executed by an operator terminal 20.

FIG. 5 is a flowchart of a recorded image sharing process executed by an operator terminal 20 according to an embodiment of the present invention. The recorded image sharing process performed by the various modules of the operator terminal 20 is described.

In step S1, a recording module 201 and a recording module 202 receive captured images and collected sound data from a wearable terminal 10, record the captured images and collected sound data, generate recode data 220, and store the record data in a storage unit 22.

In step S2, an index module 203, upon detecting that a predetermined trigger defined in trigger data 210 is included in the captured images or the collected sound data received from the wearable terminal 10, adds an index associated with the predetermined trigger to a position on a time axis of the captured images in the recorded data 220.

FIG. 6 is a diagram for explaining trigger data 210 stored in a storage unit 22 of an operator terminal 20 according to an embodiment of the present invention. In the trigger data 210, a trigger ID which is information indicating a pointing action which is a predetermined trigger is associated with reference data for detecting the predetermined trigger and a predetermined time which is a time for displaying a recorded image including the predetermined trigger in a case where the predetermined trigger is detected.

The reference data, if the predetermined trigger is a predetermined action (for example, a pointing action or the like), are trigger reference image data generated from images obtained by capturing the predetermined action from various angles or situations, and if the predetermined trigger is a predetermined user's voice or a predetermined environmental sound, are trigger reference voice data generated from the waveform data of the voice or the environmental sound.

The predetermined time is set to be different for each predetermined trigger. However, the present invention is not limited thereto, and the predetermined time may be changed according to the recorded image.

Figure 7:
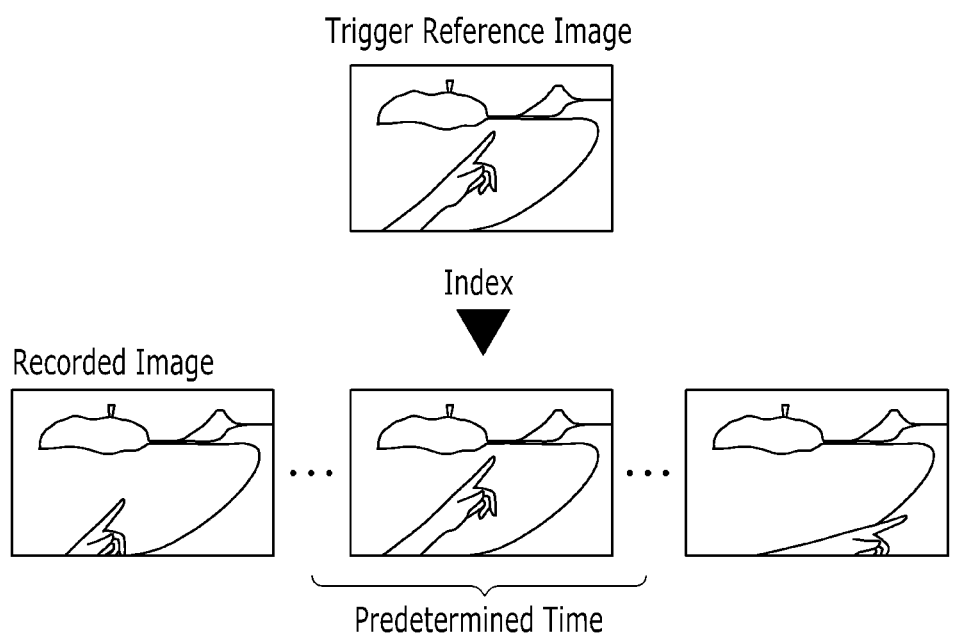
FIG. 7 is a diagram for explaining an example of a recorded image sharing process executed by an operator terminal 20.

FIG. 7 is a diagram for explaining an example of a recorded image sharing process executed by an operator terminal 20. Specifically, as shown in FIG. 7, an index module 203 compares the captured images received from the wearable terminal 10 and reference data of trigger data 210 (see FIG. 6). When detecting an approximate captured image (a captured image approximate to the trigger reference image data 01 is detected in an example shown in FIG. 7), the index module 203 adds an index associated with a trigger ID ("01" associated with a pointing action which is a predetermined trigger in the example shown in FIG. 7) to a position on a time axis of the captured image in the data 220.

Further, for example, in a case where reference data for detecting a voice (for example, a voice for uttering a start signal or a name (for example, "Mount Fuji") of a recording target) of a predetermined user are defined in the trigger data 210 (see FIG. 6), the index module 203 compares the sound data (for example, waveform data) received from the wearable terminal 10 with the reference data (such as the trigger reference voice data 01 and the like) of the trigger data 210 (see FIG. 6). When detecting an approximate waveform, the index module 203 adds an index associated with a trigger ID of the reference data to a position on a time axis where the waveform is detected in the recorded data 220.

Furthermore, for example, in a case where reference data for detecting a predetermined environmental sound (for example, an impulsive sound or a sudden braking sound) are defined in the trigger data 210 (see FIG. 6), the index module 203 compares the sound data (for example, waveform data) received from the wearable terminal 10 with the reference data (the trigger reference voice data 10 and the like) of the trigger data 210 (see FIG. 6). When detecting an approximate waveform, the index module adds an index associated with a trigger ID of the reference data to a position on a time axis where the waveform is detected in the recorded data 220.

In addition, when detecting a plurality of types of predetermined triggers (for example, a pointing action and a voice of a user uttering "Mount Fuji") at the same time or at similar times, the index module 203 adds an index associated with a combination of trigger IDs of the plurality of detected predetermined triggers.

Referring to FIG. 5 again, in step S3, the recording module 201 and the recording module 202 end the recording of the captured images and the collected sound data from the wearable terminal 10.

In step S4, when detecting that the predetermined trigger defined in the trigger data 210 is included in the captured images or the collected sound data received from the wearable terminal 10, a detecting module 204 extracts an index associated with a trigger ID indicating the detected predetermined trigger from among indexes added to the recorded data 220.

In step S5, a time changing module 205 refers to the trigger data 210 (see FIG. 6) to set the predetermined time of the trigger ID of the index extracted by the detecting module 204 in step S4 as a predetermined time for displaying a recording image including the detected predetermined trigger. The time changing module 205 functions as time changing means for changing the predetermined time in accordance with the target detected by detecting means.

In step S6, a display control module 206 displays the recorded image including the index extracted by the detection module 204 in step S4, among the recorded data 220 recorded by the recording module 201 and the recording module 202 in step S1, for the predetermined time set by the time changing module 205 in step S5. That is, the display control module 206 functions as display control means for displaying, on display means of the operator terminal 20, the recorded image of the predetermined time including the detected predetermined trigger among the recorded images. Further, in this step, the display control module 206 may display the recorded image on a display unit 16 of the wearable terminal 10.

As described above, according to an embodiment of the present invention, because the recorded image including the detected predetermined trigger among the recorded images can be displayed for the time changed according to the trigger data associated with the detected predetermined trigger (i.e., the time being appropriate to find the detected predetermined trigger), the operator can easily and quickly find the recorded image including the detected predetermined trigger (i.e., the desired recorded portion) among the recorded images.

Specifically, as shown in FIG. 7, the detecting module 204 compares the captured images received from the wearable terminal 10 and the reference data of the trigger data 210 (see FIG. 6). Upon detecting an approximate captured image (a captured image approximate to the trigger reference image data 01 is detected in the example shown in FIG. 7), the detecting module 204 extracts an index associated with a trigger ID of the detected predetermined trigger ("01" associated with a pointing action which is the predetermined trigger in the example shown in FIG. 7) from among indexes added to the recording data 220 stored in the storage unit 22.

Further, for example, in a case where reference data for detecting a voice (for example, a voice for uttering a start signal or a name (for example, "Mount Fuji") of a recording target) of a predetermined user are defined in the trigger data 210 (see FIG. 6), the detecting module 204 compares the sound data (for example, waveform data) received from the wearable terminal 10 with the reference data (such as the trigger reference voice data 01 and the like) of the trigger data 210 (see FIG. 6). When detecting an approximate waveform, the detecting module 204 extracts an index associated with a trigger ID of the detected predetermined trigger from among indexes added to the recording data 220 stored in the storage unit 22.

Furthermore, for example, in a case where reference data for detecting a predetermined environmental sound (for example, an impulsive sound or a sudden braking sound) are defined in the trigger data 210 (see FIG. 6), the detecting module 204 compares the sound data (for example, waveform data) received from the wearable terminal 10 with the reference data (the trigger reference voice data 10 and the like) of the trigger data 210 (see FIG. 6). When detecting an approximate waveform, the detecting module 204 extracts an index associated with a trigger ID of the detected predetermined trigger from among indexes added to the recording data 220 stored in the storage unit 22.

Then, the display control module 206 displays the recorded image including the index extracted by the detecting module 204 (in the example shown in FIG. 7, the recorded image of the predetermined time including the image in which the pointing action and Mount Fuji are captured), among the recorded data 220, on the display unit 24 or the display unit 16 of the wearable terminal 10 for the predetermined time set by the time changing module 205 (15 seconds when the trigger ID is "01" in the example shown in FIG. 6). When the detecting module 204 detects that a combination of a plurality of types of trigger IDs is associated with a certain index, the time changing module 205 may set a longer predetermined time in the trigger data 210 (see FIG. 6). Specifically, in the example shown in FIG. 6, when the detecting module 204 detects that a combination of trigger IDs "01" and "10" is associated with the certain index, the time changing module 205 sets the predetermined time as 30 seconds.

The means and functions described above are realized by reading and executing a predetermined program by a computer (including a CPU, an information processing device, or various terminals). The program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit so as to be stored and executed. Furthermore, the program may be, for example, recorded in a storage device (recording medium) such as a magnetic disk, an optical disk, an optical magnetic disk, or the like in advance and be provided from the recording medium to the computer.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: recorded image sharing system, 10: wearable terminal, 20: operator terminal, 24: display unit, 201: recording module, 204: detecting module, 206: display control module

What is claimed is:

1. A recorded image sharing system that shares a recorded image of a captured image captured by a wearable terminal with a connected operator terminal, the recorded image sharing system comprising:

a storage unit that stores trigger data in advance, trigger IDs indicating predetermined triggers being associated with reference data for detecting the predetermined triggers and predetermined times each being a time for displaying a recorded image including a predetermined trigger when the predetermined trigger is detected, in the trigger data;

a recording unit that records captured images captured by the wearable terminal;

a detecting unit that detects a predetermined trigger by referring to the reference data;

a time changing unit that changes a predetermined time which is a time for displaying a recorded image including the detected predetermined trigger by referring to the trigger data; and a display control unit that displays, on a display unit of the operator terminal, the recorded image including the detected predetermined trigger among the recorded images, for the predetermined time which is changed by the time changing unit.

2. The recorded image sharing system of claim 1, wherein the detecting units detects an action of a user of the wearable terminal as the predetermined trigger.

3. The recorded image sharing system of claim 1, further comprising another recording unit that records a sound collected by the wearable terminal,
wherein the detecting unit detects a voice of the user of the wearable terminal as the predetermined trigger.

4. The recorded image sharing system of claim 1, further comprising another recording unit that records a sound collected by the wearable terminal,
wherein the detecting unit detects a combination of an action and a voice of a user of the wearable terminal as the predetermined trigger.

5. The recorded image sharing system of claim 1, wherein the detecting unit detects a predetermined environmental sound as the predetermined trigger.

6. The recorded image sharing system of claim 1, wherein the recorded image of the predetermined time including the detected predetermined trigger is displayed on a display unit of the wearable terminal.

7. A method of executing by a recorded image sharing system that shares a recorded image of a captured image captured by a wearable terminal with a connected operator terminal, the method comprising:
storing trigger data in advance, trigger IDs indicating predetermined triggers being associated with reference data for detecting the predetermined triggers and predetermined times each being a time for displaying a recorded image including a predetermined trigger when the predetermined trigger is detected, in the trigger data;
recording captured images captured by the wearable terminal;
detecting a predetermined trigger by referring to the reference data;
changing a predetermined time which is a time for displaying a recorded image including the detected predetermined trigger by referring to the trigger data; and
displaying, on a display unit of the operator terminal, the recorded image including the detected predetermined trigger among the recorded images, for the predetermined time which is changed by the time changing unit.

8. A non-transitory computer-readable recording medium that stores a program for causing a computer that controls a recorded image sharing system that shares a recorded image of a captured image captured by the wearable terminal with a connected operator terminal to function as:
a storage unit that stores trigger data in advance, trigger IDs indicating predetermined triggers being associated with reference data for detecting the predetermined triggers and predetermined times each being a time for displaying a recorded image including a predetermined trigger when the predetermined trigger is detected, in the trigger data;
a recording unit that records captured images captured by the wearable terminal;
a detecting unit that detects a predetermined trigger by referring to the reference data;
a time changing unit that changes a predetermined time which is a time for displaying a recorded image including the detected predetermined trigger by referring to the trigger data; and
a display control unit that displays, on a display unit of the operator terminal, the recorded image including the detected predetermined trigger among the recorded images, for the predetermined time which is changed by the time changing unit.

* * * * *